Feb. 19, 1963 R. R. GUNDERSON 3,077,853
VEHICLE WARNING SIGNAL
Filed Sept. 13, 1961 2 Sheets-Sheet 1

Inventor:
Ralph R. Gunderson
By: Hofgren, Brady, Wegner,
Allen & Stellman
Attorneys

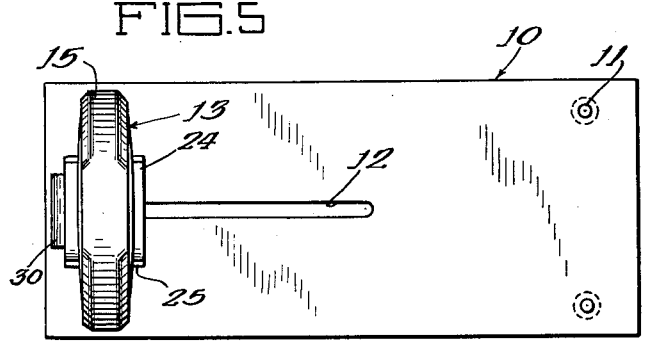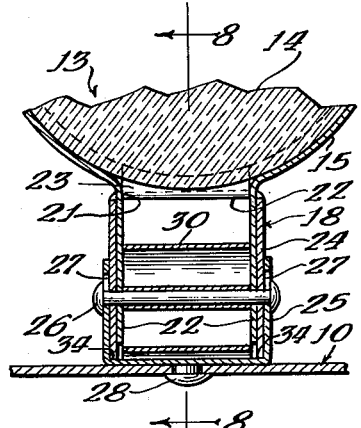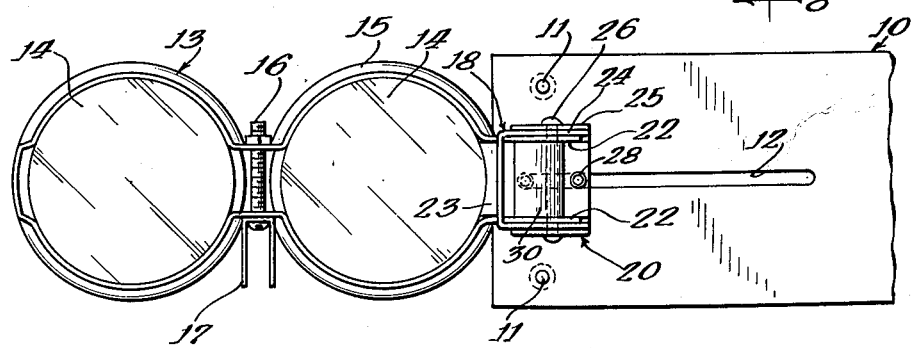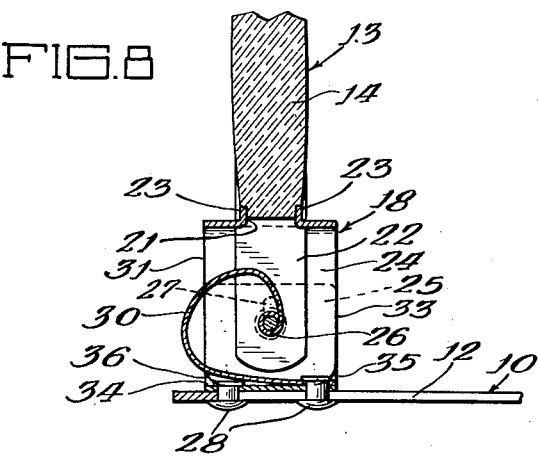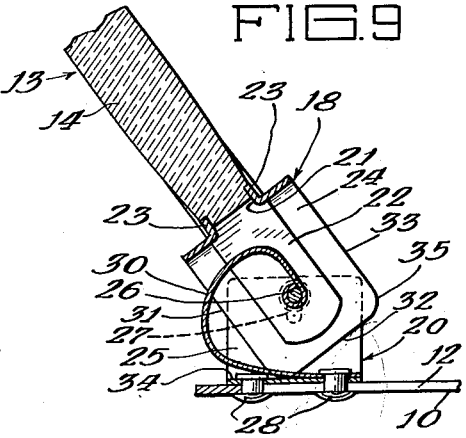

_United States Patent Office_

3,077,853
Patented Feb. 19, 1963

3,077,853
VEHICLE WARNING SIGNAL
Ralph R. Gunderson, 5520 South Shore Drive,
Chicago, Ill.
Filed Sept. 13, 1961, Ser. No. 137,814
7 Claims. (Cl. 116—63)

This invention relates to a vehicle warning signal, and more particularly to a latching structure for retaining a warning signal in a plurality of signaling positions.

The primary object of the present invention is to provide a new and improved latching mechanism for a vehicle warning signal of the type commonly carried by highway vehicles to warn approaching traffic of the existence of an emergency condition.

Another object is to provide a warning signal having a latching mechanism utilizing abutting surfaces which are yieldably held together to effectively retain the signal device in any one of a number of signaling positions and which will hold the signal device in closed inoperative position when not in use.

Another object is to provide a latching mechanism for such a warning signal which will retain the signal in signaling position while permitting it to be positioned in any one of a number of positions extending longitudinally of the signaling base.

A further object is to provide a vehicle warning signal having a latch mechanism which is particularly well adapted for manufacturing in mass production.

The invention is illustrated in a preferred embodiment in the accompanying drawings in which:

FIG. 5 is a top plan view of the warning signal shown in FIG. 3;

FIG. 6 is a fragmentary top plan view illustrating the warning signal in forward extended position;

FIG. 7 is an enlarged fragmentary sectional view taken as indicated on line 7—7 of FIG. 3;

FIG. 8 is a sectional view taken as indicated on line 8—8 of FIG. 7;

FIG. 9 is a view similar to FIG. 8 but showing the signal device being tilted forwardly toward forward extended position, and illustrating the limited yieldable movement in the hinge connection between the base and the signal device which permits the swinging movement of the signal device.

Figure 1:
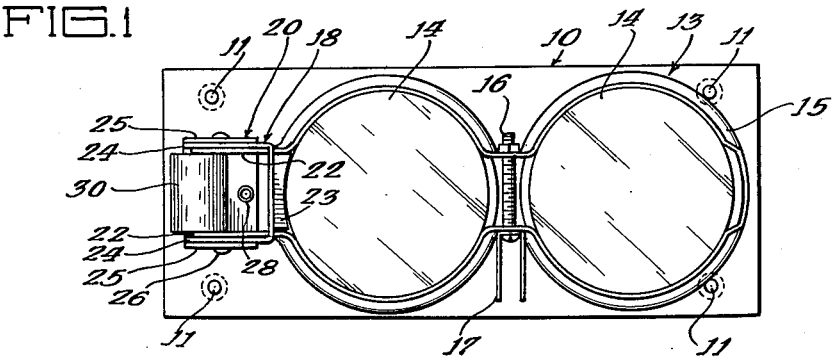
FIG. 1 is a top plan view of the warning signal.

In the embodiment illustrated, a supporting base, generally designated 10, is preferably formed from a relatively heavy gauge sheet metal which may be provided adjacent its four corners by a number of rubber supporting feet 11. The supporting base 10 is preferably provided with an elongated longitudinally extending slot 12 (FIG. 5) which extennds from the forward end 10a of the base 10 to a position substantially centrally of the base, the slot being for purposes which will later be made more apparent.

Figure 2:
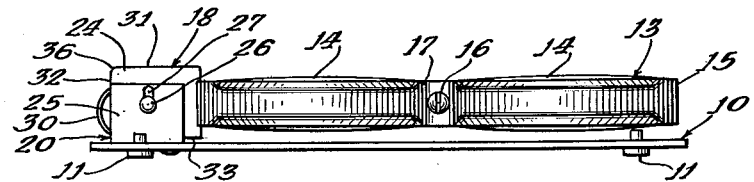
FIG. 2 is a side elevational view.

A conventional signal device, generally designated 13, is swingably mounted with respect to the base 10 for movement from a closed reclining position (FIGS. 1 and 2) through an upright signaling position (FIGS. 3 and 4) to a forward extended signaling position (FIG. 6). The signaling device 13 may include an upper pair of lenses 14 and 14a and a lower pair of lenses 14b and 14c each arranged with their reflecting surfaces facing outwardly. The two pairs of lenses are held in spaced relation by a bezel 15 embracing the major portion of the periphery of the lenses, the bezel being held in position by the nut and bolt 16 passing centrally therethrough. If desired, a U-shaped perforate bracket 17 may be provided to accommodate the staff of a warning flag.

Figure 4:
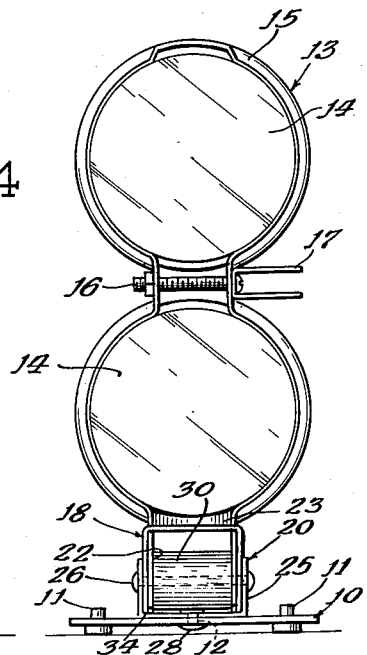
FIG. 4 is an end elevational view taken from the left of FIG. 3.

The signal device 13 is preferably swingably secured to the supporting base 10 by an inverted channel-shaped bracket, generally designated 18, which is hinged to a mounting portion, generally designated 20, on the base 10. The bracket 18 may be provided with a laterally extending slot 21 in its central web, and the free ends 22 of the bezel 15 are projected downwardly through the opposite ends of the slot 21, as best seen in FIGS. 7, 8 and 9. A pair of upwardly turned portions 23 may be struck upwardly from the web of the bracket 18 on opposite sides of the bottom of the lower pair of lenses 14. As best seen in FIGS. 4 and 8, these portions 23 hold the free ends 22 of the bezel 15 in the outer opposite ends of the slot 21.

The bracket 18 preferably has a pair of downwardly extending leg members 24 which closely abut upright extensions 25 of the base mounting portion 20. A hinge pin or journal bar 26 may be provided to pass laterally through the adjoining pairs of legs and extensions 24 and 25 and through the free ends 22 of the bezel 15 to anchor the bezel and to afford swinging movement to the signal device 13. The mounting portion 20 is preferably slidably secured to the base by a pair of rivets 28 whose shanks pass through the slot 12 in the base and whose heads closely abut the marginal peripheral portion of the base surrounding the slot 12 to lend stability to the warning signal.

In addition to the hinging action between the base 10 and the signal device 13, lost motion is provided therebetween which is instrumental in the latching of the signal device in its various positions. As will be later more completely described, the latching is effected by bringing surface portions associated with the base 10 and the signal device 13 into intimate abutting contact, and the lost motion enables the abutting surface portions to be separated so that the signal device can be swung to any one of its various positions.

As best shown in FIGS. 7, 8 and 9, each of the extensions 25 is preferably provided with an oblate slot 27 affording elongated spaced bearings for the hinge pin 26 and permitting limited relative movement of the leg members 24 and the hinge pin 26 with respect to the upright extensions in which the elongated bearings are formed. As best shown in FIG. 8, a C-shaped spring 30 may be provided having one end secured to the base 10 by a rivet 28 and having the other end secured to the hinge pin 26 so as to normally urge the hinge pin to the lower end of the slot 27.

As alluded to above, cooperative surface portions are formed on the legs 24 of the signal device 13 and on the mounting portion 20 of the base 10 which surface portions are brought into abutting engagement in order to retain or latch the signal device 13 in any one of the positions to which it may be swung. Referring to FIG. 9, it will be seen that each of the leg members 24 is provided with a forward surface portion 31, a terminal surface portion 32 and a rearward surface portion 33. these three pairs of surface portions are each constructed and shaped so as to be capable of being brought into intimate abutting contact with the opposite ends of the upper face which form spaced surface portions 34 on the medial web of the mounting portion 20 which is movably secured to the supporting base 10.

Thus, when the signal device 13 is swung from closed inoperative position (FIG. 2) toward upright signaling position (FIG. 3), rearward corners 35 of the leg members 24 bear on the web of the mounting portion 20 and cause the hinge pin 26 to be moved upwardly in the slot 27 against the action of the spring 30. As the signal device 13 approaches upright position, the hinge pin 26 rides downwardly in the slot 27, and the terminal surface portion 32 is urged toward, and finally into yielding abutment with, the surface portion 34 on the web of the mounting portion 20 by the spring 30 to firmly hold the signal device 13 in upright signaling position.

As the signal device is continued in its forward swing toward forward extended position (FIG. 6), the forward corners 36 of the leg members 24 again force the hinge pin 26 upwardly in the slots 27 as previously described, and the forward surface portion 31 comes into firm yieldable abutting contact with the surface portion 34 of the mounting portion 20 to retain the signal device in forward extended position.

Figure 3:
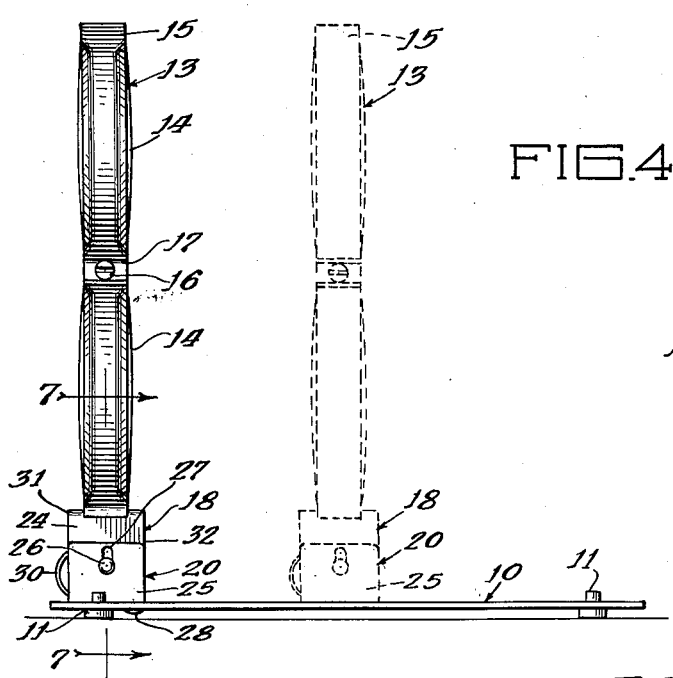
FIG. 3 is a side elevational view of the warning signal after having been swung to upright signaling position, the signal device being shown in dotted outline after having been slid to a central position on the base.

In returning the signal device 13 to closed inoperative position (FIG. 2), it is swung rearwardly in the same general manner described above, and the rear abutting surfaces 33 are brought into intimate yielding contact with the surface portions 34 to retain the signal device in closed or inoperative positon. As illustrated in FIG. 3, after the signal device 13 is moved to upright position, it may be slid longitudinally of the supporting base 10 so as to be positioned centrally of the base in any one of a number of upright operative positions.

The foregoing detailed description is given for clearness of understanding only and no unnecessary limitations should be understood therefrom for some modifications will be obvious to those skilled in the art.

I claim:

1. A vehicle warning signal, comprising: a supporting base; a signal device swingably connected to the supporting base for movement from an inoperative position to a signaling position, the connection affording lost motion between said base and signal device; longitudinally extending surface portions on the base and on the signal device positioned for firm abutting contact when the signal device is in signaling position to retain said device in said signaling position; and spring means urging said surface portions into abutting contact when the signal device is in signaling position, the lost motion of said swingable connection permitting the surface portions yieldably to be separated so that the signal device can be swung from signaling to inoperative position.

2. A vehicle warning signal as specified in claim 1 in which a second pair of longitudinally extending surface portions is provided one each on the base and on the signal device to retain the signal device in inoperative position, said second pair of surface portions being positioned for yieldable abutting engagement when the signal device is swung to said inoperative position.

3. A vehicle warning signal as specified in claim 1 in which the supporting base is provided with a mounting portion to which the signal device is swingably connected, said mounting portion being longitudinally slidable on said supporting base to vary the position of the signal device in signaling position.

4. A vehicle warning signal as specified in claim 1 in which the surface portions are positioned so that said surface portions are in yieldable abutting relation when the signal device is in upright signaling position.

5. A vehicle warning signal as specified in claim 1 in which the surface portions are positioned so that said surface portions are in yieldable abutting relation when the signal device is in forward extended position.

6. A vehicle warning signal, comprising: a supporting base; a signal device swingably connected to the supporting base for movement from an inoperative position to a signaling position, said connection affording limited movement to the connection away from the supporting base longitudinally extending; surface portions on the base and the signal device each positioned for firm abutting contact to retain the signal device in signaling position; and spring means operable between the base and signal device for urging said surface portions into abutting contact when the signal device is in signaling position, the limited movement of the connection enabling the abutting surface portions to be separated so that the signal device can be swung to inoperative position.

7. A vehicle warning signal, comprising: a supporting base having a pair of upright extensions each provided with an upwardly extending slot affording a pair of elongated bearings; a signal device having a pair of leg members each positioned adjacent an extension of the base; a journal bar extending through said leg members and being rotatably received in said bearings to afford limited upright movement between said extensions and said leg members and to provide swingable movement to said signal device between an inoperative position and a signaling position longitudinally extending; surface portions on the leg members and on the base positioned for spaced abutting contact when the signal device is in signalling position to retain said device in said signaling position; and a spring member joining said journal bar and said supporting base and urging said surface portions into spaced abutting contact when the signal device is in signaling position, said limited upright movement permitting the surface portions to be yieldably separated so that the signal device can be swung from signaling to inoperative position.

References Cited in the file of this patent

UNITED STATES PATENTS

| | | |
|---|---|---|
| 1,262,712 | Stone | Apr. 16, 1918 |
| 2,679,370 | Bosler | May 25, 1954 |